(12) United States Patent
Prost et al.

(10) Patent No.: US 12,203,504 B2
(45) Date of Patent: Jan. 21, 2025

(54) HINGED COMPONENT AND MECHANICAL SYSTEM COMPRISING SUCH A COMPONENT

(71) Applicant: HYDROMECANIQUE ET FROTTEMENT, Andrezieux-Boutheon (FR)

(72) Inventors: Fabrice Prost, Saint-Etienne (FR); Pierrick Pavallier, Perreux (FR)

(73) Assignee: HYDROMECANIQUE ET FROTTEMENT, Andrezieuz-Boutheon (FR)

( * ) Notice: Subject to any disclaimer, the term of this patent is extended or adjusted under 35 U.S.C. 154(b) by 0 days.

(21) Appl. No.: 18/765,889

(22) Filed: Jul. 8, 2024

(65) Prior Publication Data

US 2024/0369103 A1  Nov. 7, 2024

Related U.S. Application Data (63) Continuation of application No. 17/258,609, filed as application No. PCT/FR2019/051651 on Jul. 3, 2019, now Pat. No. 12,031,578.

(30) Foreign Application Priority Data

Jul. 10, 2018 (FR) ..................... 1856323

(51) Int. Cl.
*F16C 33/10* (2006.01)
*F16C 17/02* (2006.01)
*F16C 17/18* (2006.01)

(52) U.S. Cl.
CPC ............ *F16C 33/102* (2013.01); *F16C 17/18* (2013.01); *F16C 33/1095* (2013.01); *F16C 17/02* (2013.01)

(58) Field of Classification Search
CPC .......... F16C 17/02; F16C 17/18; F16C 31/02; F16C 33/04; F16C 33/102; F16C 33/121; F16C 33/1095
See application file for complete search history.

(56) References Cited

U.S. PATENT DOCUMENTS

| | | | |
|---|---|---|---|
| 6,241,393 B1 | 6/2001 | Georges et al. | |
| 10,480,569 B2* | 11/2019 | Merg | ................... F16C 11/0666 |
| 10,724,575 B2* | 7/2020 | Coombe | ................ F16C 23/045 |
| 2002/0125049 A1 | 9/2002 | Kajiyama | |
| 2009/0257694 A1 | 10/2009 | Hunter et al. | |

(Continued)

FOREIGN PATENT DOCUMENTS

| AU | 4873199 | 3/2000 |
|---|---|---|
| CN | 101978184 A | 2/2011 |

(Continued)

OTHER PUBLICATIONS

JP 2014-077522 (Year: 2014).*

*Primary Examiner* — Alan B Waits
(74) *Attorney, Agent, or Firm* — FORGE IP, PLLC (57) ABSTRACT

A hinged component with one degree of freedom includes at least two concentric rings, movable in rotation in relation to one another around a central axis, defining a friction interface therebetween and including: an outer ring having an inner friction surface and an inner ring having an outer friction surface and an inner friction surface intended to receive a movable member guided by the component in rotation, oscillation and/or translation.

6 Claims, 5 Drawing Sheets

(56) References Cited

U.S. PATENT DOCUMENTS

2011/0220762 A1\* 9/2011 Gyuricsko ............... B64C 9/22
  244/99.3
2015/0307801 A1  10/2015 Villemagne et al.
2016/0032561 A1  2/2016 Ginn et al.
2016/0238071 A1\* 8/2016 Sato .................... F16C 33/103

FOREIGN PATENT DOCUMENTS

| CN | 206221516 U | 6/2017 | |
|---|---|---|---|
| CN | 206874675 U | 1/2018 | |
| DE | 834797 C | 3/1952 | |
| EP | 0987456 | 3/2000 | |
| EP | 3076034 A1 | 10/2016 | |
| FR | 885290 | 9/1943 | |
| FR | 1418886 | 11/1965 | |
| FR | 2609316 | 7/1988 | |
| JP | S4220922 B1 | 10/1967 | |
| JP | H01172620 | 7/1989 | |
| JP | 2014077522 A \* | 5/2014 | ............. F16C 17/18 |
| WO | WO2014091123 | 6/2014 | |
| WO | WO2014091124 | 6/2014 | |

\* cited by examiner

HINGED COMPONENT AND MECHANICAL SYSTEM COMPRISING SUCH A COMPONENT

TECHNICAL FIELD

The present invention relates to a hinged component, comprising at least two concentric rings, movable in relation to one another and defining a frictional interface therebetween. The invention also concerns a mechanical system comprising such a component.

The field of the invention is that of guiding members providing a guiding function in translation or in rotation, in a continuous or reciprocating motion.

PRIOR ART

Conventionally, such a guiding member comprises a ring, designed for mounting with the capability to articulate and/or displace an element such as an axle or a shaft.

In practice, such mechanical systems are submitted to significant operational stresses: high pressure, corrosion, abrasion, shock. To improve the service life thereof, lubrication is provided for between the ring and the axle.

The ring can be provided with arrangements serving as a grease reservoir, as described for example within the documents EP0987456, WO2014091123 and WO2014091124 in the name of the Applicant.

When the mechanical system is in operation, the grease gradually emerges from arrangements in order to lubricate the friction interface between the ring and the axle. Thus, the arrangements make it possible to implement lubrication during assembly only, or alternatively with long intervals of lubrication.

The Applicant has great expertise in the field of guiding members, and continually seeks to improve existing systems.

DESCRIPTION OF THE INVENTION

The purpose of the present invention is to provide an hinged component, in particular with excellent resistance to wear and seizure, and an improved service life.

To this end, the present invention relates to an hinged component with one degree of freedom, comprising at least two concentric rings, movable in rotation in relation to one another around a central axle, defining a friction interface therebetween and including: an outer ring having an inner friction surface and an inner ring having an outer friction surface and an inner friction surface intended to receive a movable member guided by the component in rotation, oscillation and/or translation.

Thus, the invention makes it possible to provide a component that is resistant, compact and simple to implement. The component has an improved service life, as compared to a component which is composed of a single ring, and which has similar dimensions and volume.

The component has three friction surfaces forming three wear surfaces. In comparison with a component consisting of a single ring having a single internal friction surface, the service life of the component according to the invention should be multiplied by three. Surprisingly, experiments revealed that the service life thereof was multiplied by at least five.

In the case of a single articulating ring, the wear is typically localized over an angular sector extending over ⅓ of the circumference. In the case of the invention, the inner ring rotates in relation to the outer ring, which greatly increases the potential wear surface, and therefore the service life of the component.

In practice, it can be seen that the friction interface between the two rings takes priority. The opposing friction surfaces perform the function of main wear surfaces. When this interface is seized, the inner friction surface of the inner ring takes over as a wear surface.

Advantageously, the component has three friction surfaces that may be provided with a surface treatment or coating and/or arrangements capable of serving as a reserve of lubricant. Thus, the invention provides greater control in the design of the component, making it possible to adapt the wear resistance thereof to every application.

According to other advantageous features of the invention, considered alone or in combination:

The friction surfaces delimiting the friction interface are cylindrical.

The friction surfaces delimiting the friction interface are slightly curved. The absolute bend radius of each friction surface is strictly greater than the radius of the friction interface under consideration.

The friction interface between the rings receives a lubricant. The component comprises sealing means designed to prevent leakages of lubricant from the friction interface.

The lubricant is grease.

The component comprises side elements limiting the axial and angular movement of the inner ring in relation to the outer ring.

The sealing means comprise a flange on a first side of the friction interface, and a shoulder on a second side of the friction interface.

The sealing means comprise a flange on each side of the friction interface.

The sealing means comprise a washer interposed between the inner ring on the one hand, and the flange or shoulder on the other hand, on each side of the friction interface.

The washer is in PTFE.

At least one of the friction surfaces comprises a surface treatment or coating with physical properties different from a base material of the ring.

The surface treatment or coating is multilayer or monolayer.

The coating is produced by means of physical vapor deposition (PVD).

The coating is produced by means of chemical vapor deposition (CVD).

The coating is produced by means of thermal spraying.

The coating is produced by means of cold spraying.

The coating is sprayed in powder form.

The coating is sprayed in the form of drops.

The coating is produced by means of thermal spraying a high velocity oxy fuel (HVOF).

The coating is produced by means of laser cladding.

The coating is anti-seizing.

The coating comprises an outer layer of DLC ("diamond-like carbon") type amorphous carbon, in particular with a thickness of between 1 and 5 μm, for example 3 μm.

The coating comprises an outer layer of a self-lubricating composite, in particular based upon resin and/or woven or non-woven reinforcing, comprising for example PTFE, MoS2 or graphite type fillers.

The coating comprises a polymer lacquer.

The treatment is nitriding, and the friction surface has a compound layer (oxide coating) having a thickness in particular of between 5 and 50 µm for example 20 µm.

The treatment is a hardening over a thickness of between 0.5 and 4 mm, for example 2 mm.

At least one of the friction surfaces comprises arrangements capable of serving as a reserve of lubricant.

The arrangements comprise cavities of a circular or alveolar section.

The cavities are macro-cavities, each having a diameter of between 2 and 15 mm, for example 6 mm.

The cavities are microcavities, each having a greater length of between 15 and 100 µm, and a depth of between 50 nm and 100 µm.

The arrangements comprise circular or helical grooves.

The arrangements comprise a grid.

The arrangements comprise chevrons.

The same surface may comprise arrangements of several different types, or of only one type.

The arrangements have a surface density of between 5 and 65%, the surface density being defined as the ratio between the total area covered by the arrangements and the total area of said area including these arrangements.

Each friction surface comprises a surface treatment or coating having physical properties different from a base material of the ring and/or arrangements capable of serving as a reserve of lubricant.

At least one of the friction surfaces comprises simultaneously a surface treatment or coating having physical properties different from a base material of the ring and arrangements capable of serving as a reserve of lubricant.

The outer ring and/or the inner ring is metallic, for example in steel, cast iron, aluminum, copper alloy, etc.

The outer ring and/or the inner ring is of a composite material.

The component exclusively comprises two concentric rings, the friction interface being defined directly between the inner friction surface of the outer ring and the outer friction surface of the inner ring.

The hinged component comprises at least three concentric rings.

The hinged component comprises three rings, with a single friction interface defined between the three rings. In other words, two rings are attached to one another, for example by means of bonding, welding or any other technique.

The intermediate ring is self-lubricating. More specifically, the outer friction surface and/or the inner friction surface of the intermediate ring is self-lubricating.

The intermediate ring comprises a winding of fabric strips and a resin comprising fillers, mixed in such a way as to implement a homogeneous product, the strips being crossed over several layers by means of filament winding.

The hinged component comprises three rings, with a friction interface defined between each pair of rings. In other words, the three rings are movable in relation to one another.

The intermediate ring is metallic.

The intermediate ring is made from a composite material.

The hinged component comprises four or more rings.

The invention also relates to a mechanical system, comprising a hinged component as mentioned above, and a movable member guided by the component in rotation, oscillation and/or translation.

The mechanical system comprises four friction surfaces, namely the outer surface of the axle, and the three surfaces of the hinged component. In comparison with an axle mounted within one ring, the service life of the mechanical system is greatly improved.

BRIEF DESCRIPTION OF THE DRAWINGS

The invention will be better understood upon reading the following description, given solely as a non-limiting example, and made with reference to the accompanying figures wherein.

DETAILED DESCRIPTION OF THE INVENTION

In FIGS. 1 to 5 a mechanical system is shown according to the invention, comprising a hinged component 1 also according to the invention, and an axle 2 mounted within the component 1. The axle 2 is guided by the hinged component 1, in rotation (pivoting in one direction, usually over several revolutions), oscillation (pivoting in two alternate directions, generally over a portion of a turn) and/or translation (movement in the axial direction).

The hinged component 1 comprises two concentric rings 10 and 20, movable in rotation in relation to one another around a central axis X1. The two rings 10 and 20 define therebetween a friction interface 40 receiving a lubricant L, preferably grease.

The two rings 10 and 20 include an outer ring 10 and an inner ring 20. The outer ring 10 has an inner cylindrical friction surface 12, and an outer cylindrical bearing surface 14. The inner ring 20 has an outer cylindrical friction surface 22, and an inner cylindrical friction surface 24.

The surfaces 12 and 22 define the friction interface 40 therebetween, radially to the central axis X1. The surface 14 is provided for the mounting of the outer ring 10 within a borehole. A channel 42 is arranged radially through the ring 10 between the surfaces 12 and 14, in order to lubricate the interface 40. The surface 24 is provided for receiving the axle 2, more precisely the outer cylindrical surface 4 of the axle 2. Thus, the axle 2 is guided by the component 1 in rotation, oscillation and/or translation.

The component 1 comprises sealing means 60 designed to prevent leakages of lubricant L from the friction interface 40. The component 1 thus constitutes a sealed lubricated structure. The relative rotation between the rings 10 and 20 is greatly facilitated, and the risk of seizing is reduced.

The sealing means 60 comprise lateral members 62, 64, 66 and 68 limiting the axial displacement of the inner ring 20 in relation to the outer ring 10. More specifically, the sealing means 60 comprise a flange 62 and a washer 66 on a first side of the interface 40, and a shoulder 64 and a washer 68 on a second side of the friction interface 40. The elements 62, 64, 66 and 68 are annular and centered on the axis X1. The shoulder 64 is part of the ring 10. The elements 62, 66 and 68 are separate from the rings 10 and 20. The washer 68 is mounted within a groove 67 formed within the ring 10, against the shoulder 64. The elements 62 and 66 are mounted within a housing 61 provided for this purpose within the ring 10, opposite the shoulder 64.

Alternatively, the sealing means 60 may comprise two removable flanges mounted on opposite sides of the component 1.

The component 1 is non-jointed, in other words it does not constitute a spherical joint. The assembled component 1 has only one degree of freedom, namely the pivotal connection between the rings 10 and 20 around the central axis X1. The rings 10 and 20 are freely movable in relation to one another around the axis X1, but are not freely movable according to the other degrees of freedom, in translation and rotation.

The friction surfaces 12 and 22 may be cylindrical.

Alternatively, the surfaces 12 and 22 may be slightly curved. In other words, the surfaces 12 and 22 are surfaces of revolution, with a circular section and elliptical or parabolic generatrix. The curvature of each surface 12 and 22 (considered within a radial plane comprising the axis X1) always has a radius that is greater than the radius (considered within a plane transverse to the axis X1) of the friction interface 40.

Preferably, at least one of the friction surfaces 12/22/24 comprises a surface treatment or coating having physical properties different from a base material of the corresponding ring 10/20.

More preferably, at least one of the friction surfaces 12/22/24 comprises arrangements capable of acting as a reserve of lubricant L.

Still preferably, each friction surface 12/22/24 comprises a surface treatment or coating having physical properties different from a base material of the ring 10/20; and/or arrangements capable of acting as a reserve of lubricant L.

By way of a non-limiting example:
the rings 10 and 20 are made of steel;
the surface 12 is subjected to a nitriding treatment and has an outer layer 16 of nitrided steel, with a compound layer (oxide coating) having a thickness of around 20 µm;
the surface 12 includes arrangements 18 in the form of circular section cavities, uniformly distributed around the central axis X1, capable of acting as a reserve of lubricant L at the interface 40 between the rings 10 and 20;
the surface 22 is coated with an outer layer 26 of DLC type amorphous carbon having a thickness in the order of 3 µm, with or without a sub-layer (composed for example of chromium or chromium nitride); and
the surface 24 includes arrangements 28 in the form of circular grooves, wound around the central axis X1 and regularly spaced along the central axis X1, capable of acting as a reserve of lubricant L at the interface between the ring 20 and the axle 2.

The invention makes it possible to provide a hinged component that is resistant, compact and simple to implement. The component 1 comprising two rings 10 and 20 has an improved service life, as compared to a component which is composed of a single ring, and having similar dimensions and volume.

In the case of a single articulating ring, the wear is typically localized over an angular sector extending over ⅓ of the circumference. In the case of the invention, the inner ring 10 rotates in relation to the outer ring 20, which greatly increases the potential wear surface, and therefore the service life of the component.

In practice, it can be seen that the friction interface 40 between the two rings 10 and 20 takes priority. The opposing friction surfaces 12 and 22 perform the function of main wear surfaces. When this interface 40 is seized, the inner friction surface 24 of the inner ring 20 in contact with the surface 4 of the axle 2 takes over as a wear surface.

The component 1 has three friction surfaces 12, 22 and 24 forming three wear surfaces, which may be provided with a treatment, a coating and/or arrangements. Thus, the invention provides greater control in the design of the component 1, making it possible to adapt the wear resistance thereof to every application.

The mechanical system comprises four friction surfaces, i.e., the outer surface 4 of the axle 2, and the three surfaces 12, 22 and 24 of the component 1. In comparison with an axle mounted within a single ring, the service life of the mechanical system is greatly improved.

Other embodiments of hinged components 1 according to the invention are shown in FIGS. 6 to 14. Some elements that form part of the component 1 are comparable to those of the first embodiment described above, and for the purposes of simplification bear the same numerical references.

FIGS. 6 to 10 show another mechanical system according to the invention comprising a variant of the component 1 and an axle 2 mounted within the component 1. The friction surfaces 12/22/24 are devoid of a surface treatment or coating, and arrangements reservoirs of lubricant L. The sealing means 60 comprise a flange 62 and a shoulder 64 on opposite sides of the interface 40. Thus, the component 1 is simpler and less expensive to manufacture than in the first embodiment. Notwithstanding the absence of a treatment, coating or arrangements, the component 1 comprising two rings 10 and 20 has an improved service life, as compared to a component which is composed of a single ring, and having similar dimensions and volume.

Figure 1:
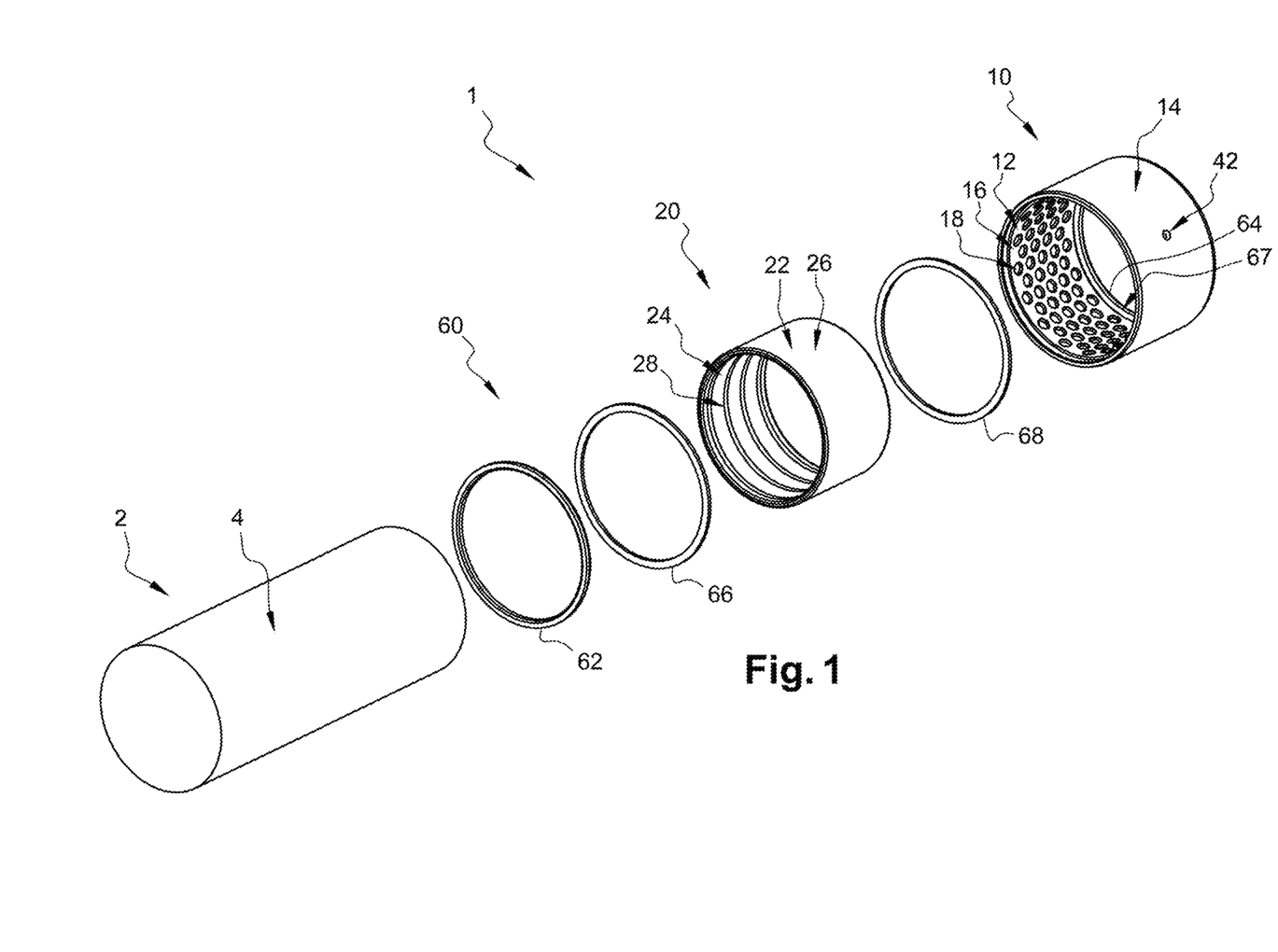
FIG. 1 is an exploded perspective view of a mechanical system according to the invention, comprising an axle and a hinged component consisting of two rings and sealing means.
Figure 2:
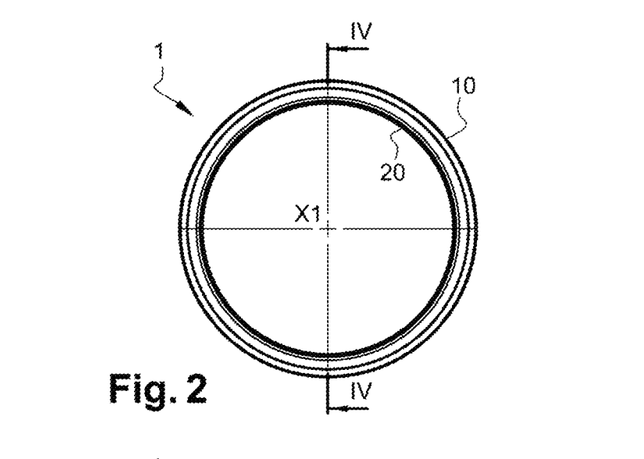
FIG. 2 is a side view of the component of FIG. 1.
Figure 3:
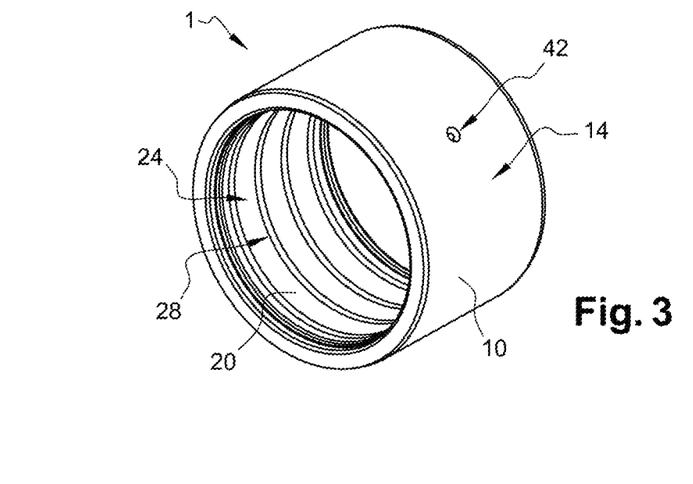
FIG. 3 is a perspective view of the component of FIG. 1.
Figure 4:
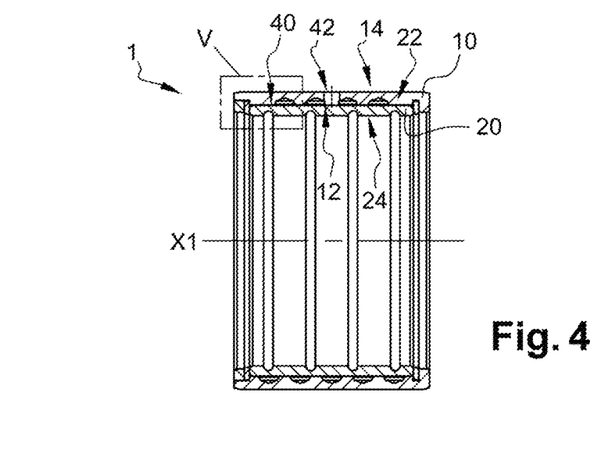
FIG. 4 is a cross-section along line IV-IV in FIG. 2.
Figure 5:
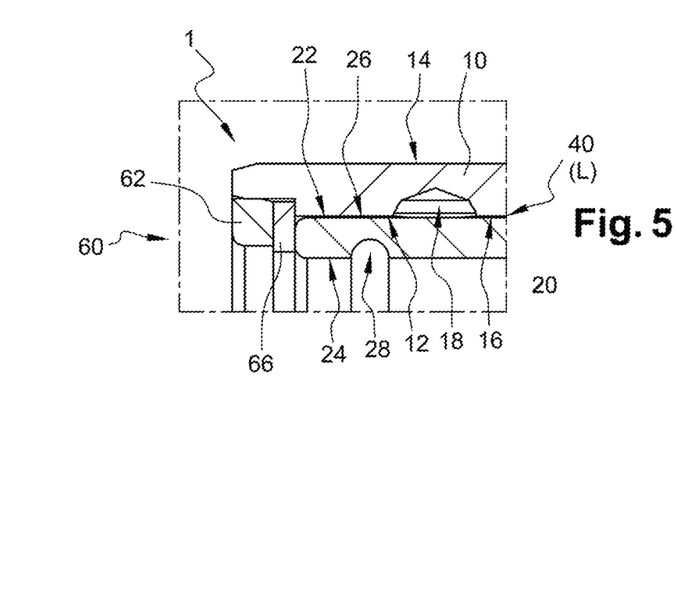
FIG. 5 is a larger scale view of the detail V in FIG. 4.
Figure 6:
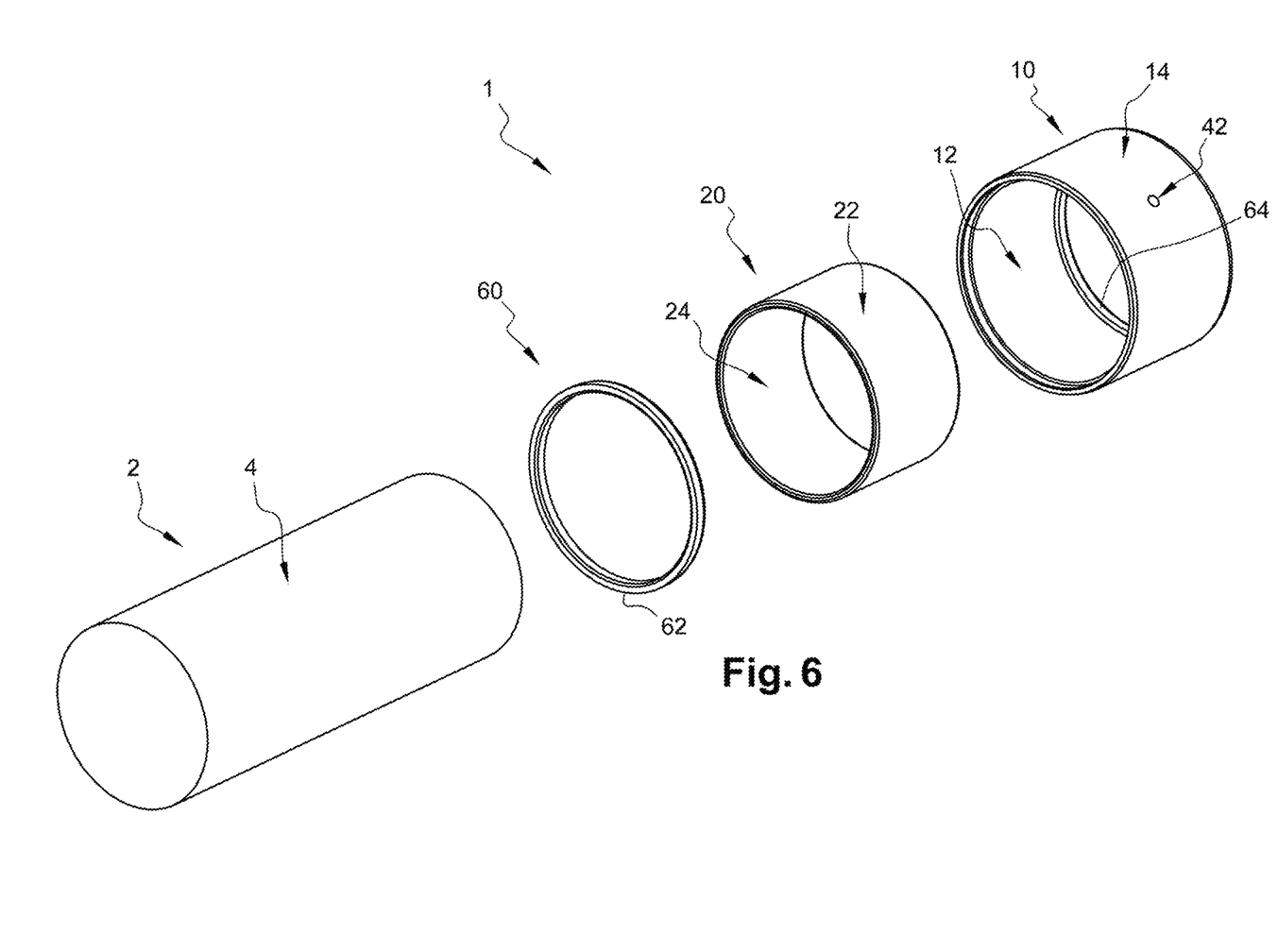
FIG. 6 is an exploded perspective view of another mechanical system according to the invention, comprising an axle and a variant of the hinged component.
Figure 7:
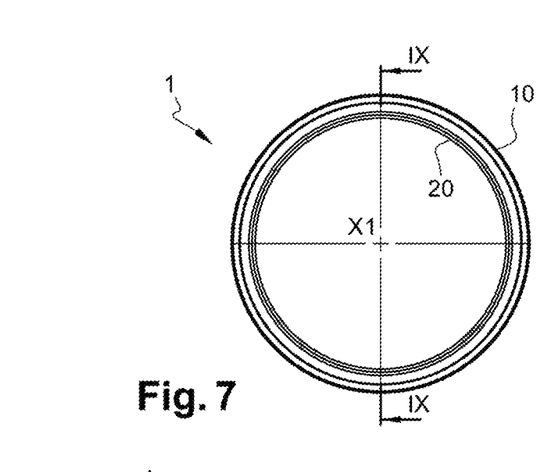
FIGS. 7 to 10 are views that are similar to FIGS. 2 to 5 for the component of FIG. 6.
Figure 8:
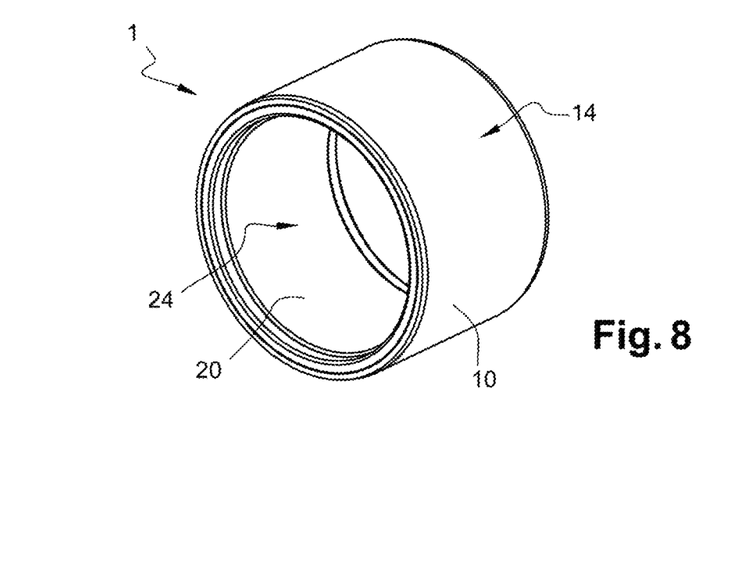
Figure 9:
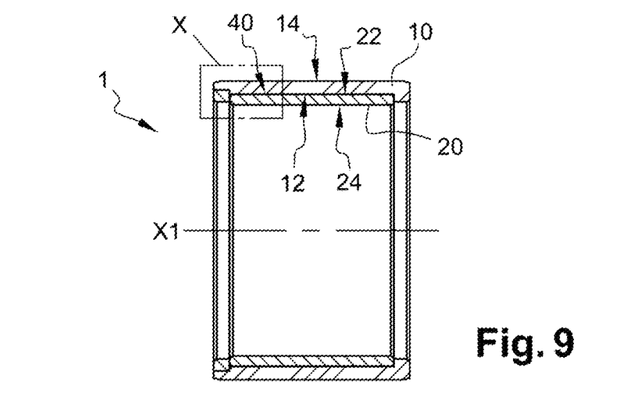
Figure 10:
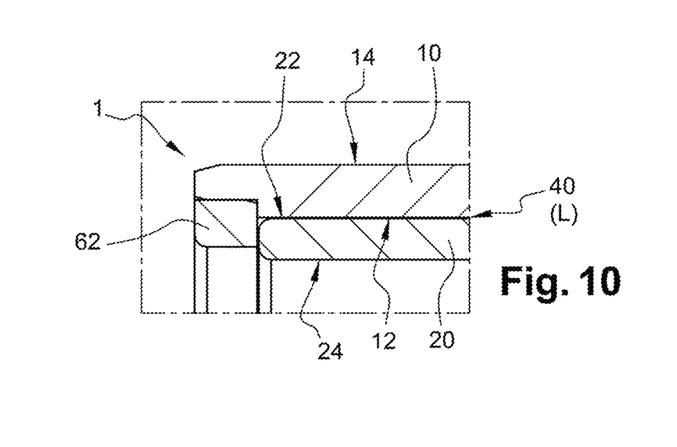
Figure 11:
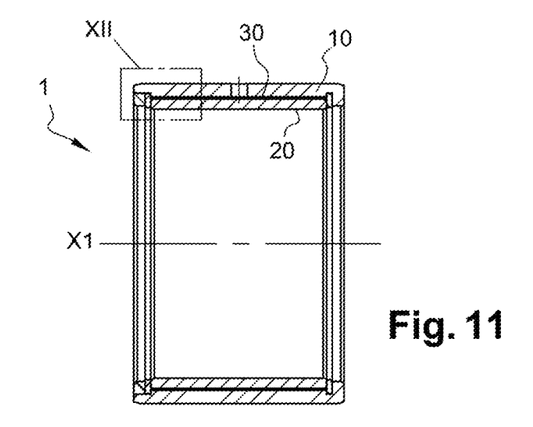
FIGS. 11 and 12 are views that are similar to FIGS. 4 and 5, for another variant of the component, comprising three rings defining two friction interfaces therebetween.
Figure 12:
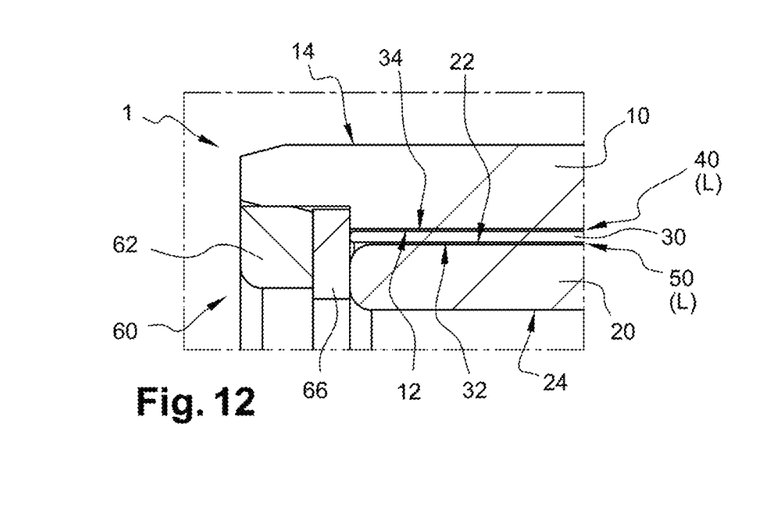

FIGS. 11 and 12 show a variant of the hinged component 1 comprising three concentric rings 10, 20 and 30, movable in relation to one another. The ring 30 is located between the rings 10 and 20. A first friction interface 40 is defined between the rings 10 and 30. A second friction interface 50 is defined between the rings 20 and 30. The component 1 has five friction surfaces 12, 22, 24, 32 and 34 forming five wear surfaces, which may be provided with a treatment, a coating and/or arrangements.

Figure 13:
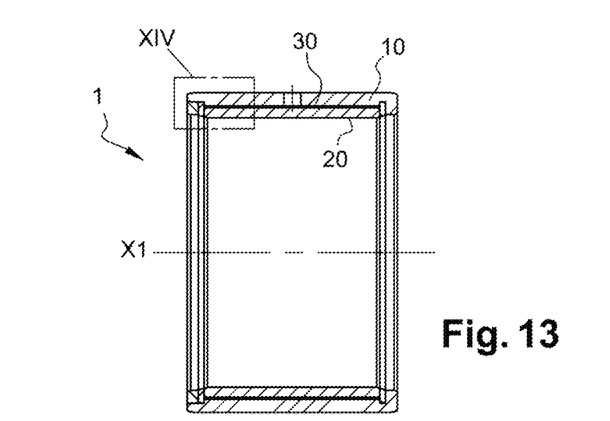
FIGS. 13 and 14 are views that are similar to FIGS. 4 and 5, for another variant of the component, comprising three rings defining a single friction interface therebetween.
Figure 14:
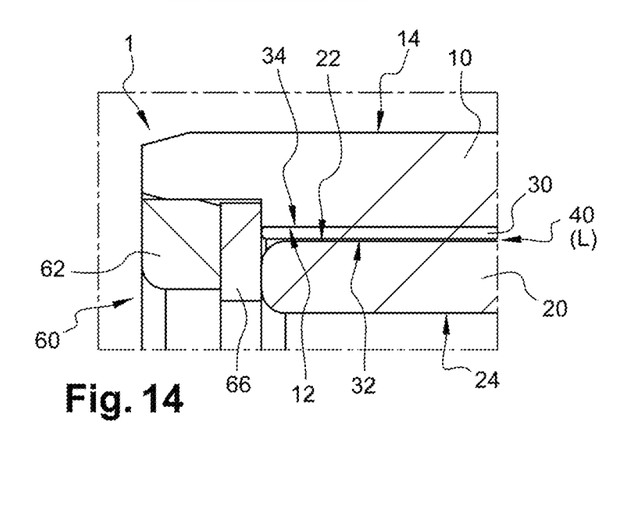

FIGS. 13 and 14 show a variant of the hinged component 1 comprising three concentric rings 10, 20 and 30. The ring 30 is located between the rings 10 and 20. The rings 20 and 30 are movable in relation to one another, and define a friction interface 50 therebetween. The ring 30 is attached to the ring 10, for example by means of bonding. The ring 30 can constitute a winding of fabric strips and a resin comprising fillers, mixed in such a way as to implement a homogeneous ring, the strips being crossed over several layers by means of filament winding. The component 1 has three friction surfaces 22, 24 and 32 forming three wear surfaces, which may be provided with a treatment, a coating and/or arrangements.

In practice, the hinged component 1 can be configured differently from FIGS. 1 to 14 without going beyond the scope of the invention. Moreover, the technical characteristics of the various embodiments mentioned above can, as a whole or in part, be combined with each other. Thus, the component 1 can be adapted in terms of cost, functionalities and performance.

Tables 1-5 below show a series of tests that make it possible to compare two reference rings (a single ring receiving an axle) and different embodiments of the invention.

TABLE 1

Parameters and test conditions

| | |
|---|---|
| Bench | Large Oscillation test bench |
| Law of motion | Sinusoidal oscillation axis |
| Oscillation amplitude | 100° |
| Projected pressure | 90 MPa |
| Average V over one oscillation | 0.0079 m/s |
| Average PV | 0.7 MPa · m/s |
| Grease (type) | Extreme Pressure Grease |
| Lubrication | Initial only |
| Ring material | Steel |
| Axle material | 16NC16 Case hardened steel |
| Stoppage criterion | COF > 0.35 |
| | T° > 120° C. |
| | Wear > 0.5 mm |

TABLE 2

Pressure build-up at the start of a test

| Pressure | 10 MPa | 30 MPa | 60 MPa | 80 MPa | 90 MPa |
|---|---|---|---|---|---|
| Number of cycles | 100 | 100 | 100 | 200 | 500,000 |

TABLE 3

Improvements provided on the friction surfaces of the rings

| Designation | Improvement characteristics |
|---|---|
| AM1 | The inner friction surface has arrangements in the form of circular section cavities regularly distributed around the central axis, acting as a lubricant reservoir. |
| AM2 | The inner friction surface receives a nitriding treatment and has a compound layer (oxide coating) having a thickness of around 20 μm. |
| AM3 | The inner friction surface comprises a polymer lacquer coating. |
| AM4 | The outer friction surface is coated with an outer layer of DLC type amorphous carbon having a thickness of around 3 μm. |
| AM5 | The inner friction surface has arrangements, in the form of circular grooves wound around the central axis and regularly spaced along the central axis, acting as a lubricant reservoir. |
| Ring 30 | An intermediate ring 30 made from a self-lubricating composite is bonded to the inner surface of the outer ring 10. |

TABLE 4

Test results-Simple rings

| Reference | AM1 | AM2 | AM3 | Number of cycles performed |
|---|---|---|---|---|
| B1 | No | No | No | 1,500 |
| B2 | Yes | Yes | Yes | 125,000 |

TABLE 5

Test Results-Components complying with the invention

| Reference component 1 | Outer ring 10 Inner surface 12 | | | Inner ring 20 | | Intermediate ring 30 | Number of cycles performed |
|---|---|---|---|---|---|---|---|
| | AM1 | AM2 | AM3 | AM4 Surface 22 | AM5 Surface 24 | | |
| C-BH1 | No | No | No | No | No | No | 7,000 |
| C-BH2 | Yes | Yes | Yes | No | No | No | 350,000 |
| C-BH3 | Yes | Yes | Yes | Yes | No | No | 410,000 |
| C-BH4 | Yes | Yes | Yes | Yes | Yes | No | 530,000 |
| C-BH5 | Yes | Yes | No | Yes | Yes | Yes | >500,000 |

The results of the series of tests allow the following observations to be made:
   The C-BH1 component completed a number of cycles equivalent to 4.6 times that of the B1 ring.
   The C-BH2 component completed a number of cycles equivalent to 3.6 times that of the B2 ring.
   The C-BH3 component completed a number of cycles equivalent to 4 times that of the B2 ring.
   The C-BH4 component completed a number of cycles equivalent to 4.6 times that of the B2 ring.
   The test conducted for the C-BH5 component was voluntarily stopped at 500 000 cycles. The service life thereof is much higher than that of the B2 ring.

Thus, the invention makes it possible to provide a hinged component 1 that is resistant, compact and simple to implement. The component 1 comprising several rings has an improved service life, as compared to a component which is composed of a single ring, and having similar dimensions and volume.

The invention claimed is:
1. A hinged component with one degree of freedom, comprising three concentric rings, rotatable with respect to one other about a central axis, defining two friction interfaces therebetween, and including:
   an outer ring having an inner friction surface,
   an inner ring having an outer friction surface and an inner friction surface provided to receive a movable element guided by the component in rotation, oscillation and/or translation, and
   an intermediate ring located between the outer and inner rings;
a first friction interface being defined between the intermediate ring and the outer ring, a second friction interface being defined between the intermediate ring and the inner ring, the component having therefore five friction surfaces including the inner friction surface of the outer ring, the inner friction surface of the inner ring and the outer friction surface of the inner ring,
the first and second friction interfaces between the outer, inner and intermediate rings receiving a lubricant and at least one of the friction surfaces comprises arrangements capable of acting as a reserve of lubricant;
wherein:
the component comprises a seal on opposite sides of the component arranged to prevent leaks of lubricant out of the first friction interface.

2. The hinged component according to claim 1, comprising lateral elements limiting axial and angular movement of the inner ring relative to the outer ring.

3. The hinged component according to claim 1, wherein at least one of the friction surfaces comprises a surface treatment or coating having physical properties different from a base material of the outer, inner and intermediate rings.

4. The hinged component according to claim 1, wherein each friction surface comprises a surface treatment or coating having physical properties different from a base material of the outer, inner and intermediate rings and/or arrangements capable of acting as a reserve of lubricant.

5. The hinged component according to claim 1, wherein the outer ring and the inner ring are made of metal.

6. A mechanical system, comprising a hinged component according to claim 1, and a movable element guided by the component in rotation, oscillation and/or translation.

\* \* \* \* \*